(12) United States Patent  
Steiner et al.

(10) Patent No.: US 9,262,596 B1  
(45) Date of Patent: Feb. 16, 2016

(54) CONTROLLING ACCESS TO CAPTURED MEDIA CONTENT

(75) Inventors: Matthew Steiner, Mountain View, CA (US); Keith Shoji Kiyohara, Santa Monica, CA (US)

(73) Assignee: Google Inc., Mountain View, CA (US)

( * ) Notice: Subject to any disclaimer, the term of this patent is extended or adjusted under 35 U.S.C. 154(b) by 391 days.

(21) Appl. No.: 13/441,326

(22) Filed: Apr. 6, 2012

(51) Int. Cl.
- *G06F 21/10* (2013.01)
- *G06F 17/30* (2006.01)

(52) U.S. Cl.
CPC .......... *G06F 21/10* (2013.01); *G06F 17/30265* (2013.01)

(58) Field of Classification Search
CPC ................. H04N 2201/0084; G06F 17/30265; G06F 17/30247; G06F 21/10; G06F 17/30041; G06F 17/30241
USPC ...................................... 726/27–30
See application file for complete search history.

(56) References Cited

U.S. PATENT DOCUMENTS

| | | | |
|---|---|---|---|
| 2006/0026184 A1* | 2/2006 | Hewing et al. | 707/101 |
| 2011/0066743 A1* | 3/2011 | Hurley et al. | 709/231 |
| 2011/0083101 A1* | 4/2011 | Sharon et al. | 715/800 |
| 2013/0124508 A1* | 5/2013 | Paris et al. | 707/723 |
| 2013/0173796 A1* | 7/2013 | Grab et al. | 709/225 |

OTHER PUBLICATIONS

Hu et al., Multiparty Authorization Framework for Data Sharing in Online Social Networks, Data and Applications Security and Privacy XXV, 2011, pp. 29-43. 25th Annual IFIP WG 11.3 Conference, DBSec 2011, Richmond, VA, USA, Jul. 11-13, 2011. Proceedings.
O'Dell, Julie, "Flickr now lets you geofence your pics for improved privacy", VentureBeat, Aug. 30, 2011, 5 pages.
Vazquez-Fernandez et al., "Built-in face recognition for smart photo sharingin mobile devices", Gradiant, 4 pages. Multimedia and Expo (ICME), 2011 IEEE International Conference on, Jul. 11-15, 2011.

* cited by examiner

*Primary Examiner* — Alexander Lagor  
(74) *Attorney, Agent, or Firm* — IP Spring

(57) ABSTRACT

Systems and methods for controlling access to captured media content may involve basing a user identifier's permissions on location and/or time data associated with the user identifier. The location data may be indicative of one or more geographical locations at which a user device associated with the user identifier was, or is, located. In some cases, the permissions of the user identifier may be based in part on a comparison between the location data associated with the user identifier and data indicative of where and/or when the media content was captured.

17 Claims, 4 Drawing Sheets

CONTROLLING ACCESS TO CAPTURED MEDIA CONTENT

BACKGROUND

The present disclosure generally relates to controlling access to captured media content, such as a digital photograph. The present disclosure more specifically relates to using location and/or time data associated with captured media content to control access to the content.

The proliferation of image sensing devices in recent years has led to digital photography overtaking film-based solutions as the most prevalent technology in the field. For example, many modern portable electronic devices (cellular telephones, music players, tablet computers, etc.) now include integrated camera functions. In general, these devices capture digital photographs via integrated image sensors that convert optical signals into electronic data that is stored in electronic memories. For example, many devices now include charge-coupled device (CCD) or complimentary metal-oxide-semiconductor (CMOS) sensors to capture digital photographs. A captured digital photograph may then be viewed on an electronic display, printed, or shared with others via the Internet.

SUMMARY

Implementations of the systems and methods for controlling access to captured media content are described herein. One implementation is a computerized method for interacting with captured media content. The method includes receiving location data indicative of a geographic location at which the media content was captured. The method also includes receiving timestamp data indicative of a time at which the media content was captured. The method further includes associating the location and timestamp data with the media content. The method yet further includes receiving, at a processing circuit, location and timestamp data from an electronic device, the electronic device being associated with a user identifier and indicative of a geographic location and time at which the electronic device was located. The method additionally includes receiving, at a processing circuit, a request to view the media content, the request being associated with the user identifier and received from the electronic device. The method also includes comparing, by the processing circuit, location and timestamp data associated with the media content with the location and timestamp data associated with the electronic device. The method additionally includes providing, via a network interface, the media content to the electronic device based in part on a determination that the electronic device was present when the media content was captured.

Another implementation is a computerized method for interacting with captured media content. The method includes storing the media content in a memory, the media content having associated data indicative of a geographic location at which the media content was captured. The method also includes receiving, at a processing circuit, a request to perform an action regarding the media content, the request being associated with user location data indicative of one or more locations of a requesting user. The method further includes performing the requested action based in part on a comparison between the data indicative of the geographic location at which the media content was captured and the one or more locations indicated by the user location data.

A further implementation is a computerized system for interacting with captured media content. The system includes a processing circuit operable to store the media content, the media content having associated data indicative of a geographic location at which the media content was captured. The processing circuit is further operable to receive a request to perform an action regarding the media content, the request being associated with user location data indicative of one or more locations of a requesting user. The processing circuit is also operable to perform the requested action based in part on a comparison between the data indicative of the geographic location at which the media content was captured and one or more locations indicated by the user location data.

These implementations are mentioned not to limit or define the scope of this disclosure, but to provide examples of implementations to aid in understanding thereof.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

According to some aspects of the present disclosure, access to captured media content may be controlled by creation of a geo fence. In general, a geo fence refers to a set of one or more location-based permissions. In various implementations, the location at which the media content was captured may be used to create a geo fence for the media content. For example, assume that a photograph was taken at a certain restaurant in Manhattan. Location data indicative of where the digital photograph was captured may then be used to restrict access to the photograph by other users and/or limit the actions that may be performed with respect to the photograph (e.g., commenting on the photograph, tagging an object in the photograph, sharing the photograph with others, viewing the photograph, editing the photograph, etc.).

In various implementations, location data associated with a user profile may be compared to a location within the captured content's geo fence to determine the permissions for the user profile. In some implementations, data indicative of a user's current location may be compared to the geo fence to determine the user's permissions regarding the content. For example, a user may be able to access a photograph when he or she is at school, but not when the user is at the mall. Thus, permissions regarding the digital photograph may be based on a comparison between the accessing device's location and the location at which the photograph was captured.

According to various implementations, a geo fence for captured media may also be based on timestamp data. For example, assume that a digital photograph was taken at a concert in Chicago. One potential geofence may restrict access to the photograph to users that are currently located in Chicago. However, another potential geofence may restrict access to only those users that were present at the time the photograph was captured. For example, only users that were at the same concert in Chicago may be able to access a photograph taken at that concert. In further implementations, time data may be used to restrict access, without regard to location data. For example, access to captured media content may be restricted based on when the media content was captured and/or based on when access is requested (e.g., access to the content is limited only to a particular time).

Figure 1:
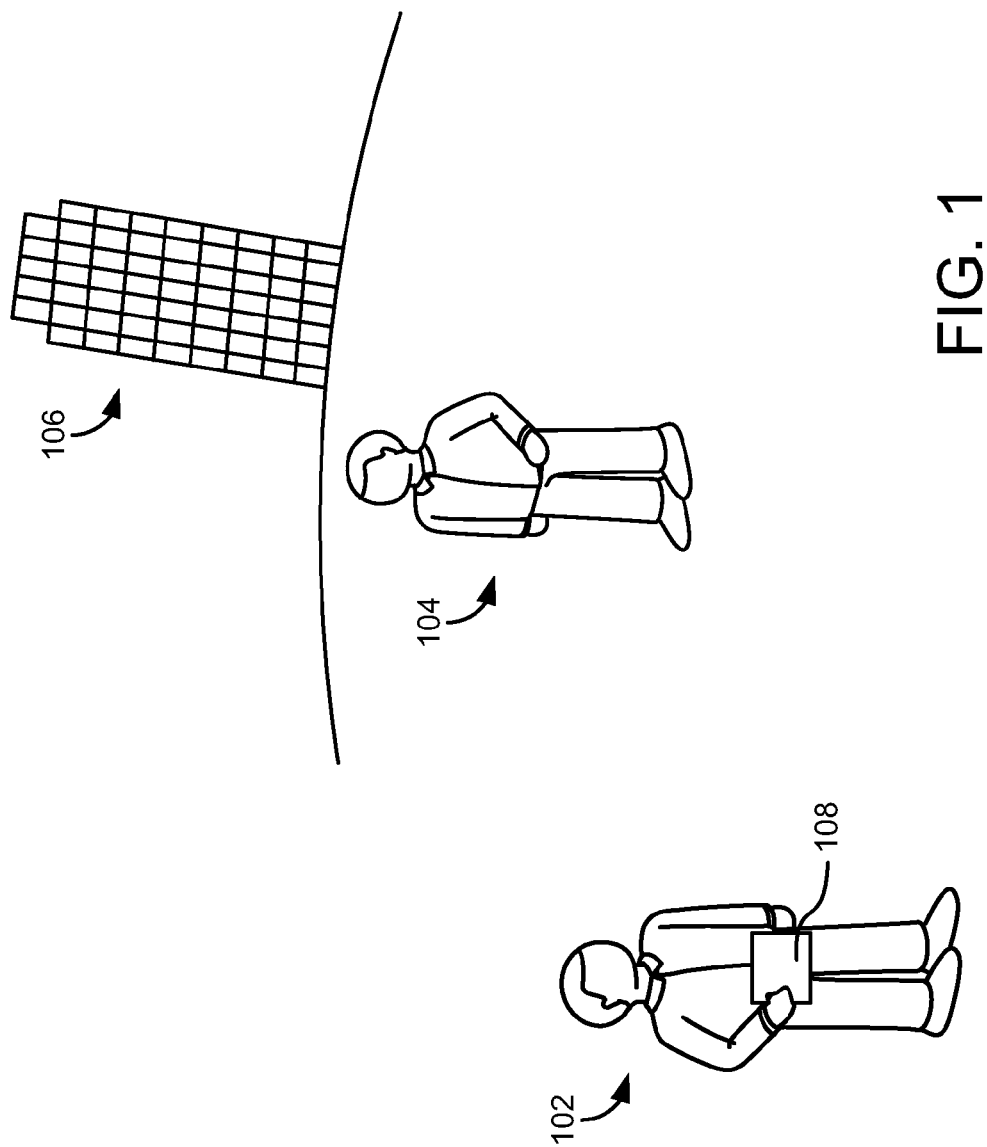
FIG. 1 is an illustration of media content being captured.

Referring to FIG. 1, an illustration is shown of media content being captured, according to one example. User 102 may operate a mobile device 108 to capture the photograph, according to various implementations. Mobile device 108 may be any form of portable electronic device having an integrated camera. For example, mobile device 108 may be a cellular telephone, a laptop computer, a tablet computer, a portable video game player, a camcorder, a digital camera, etc. The integrated camera may include a CCD sensor, a CMOS sensor, an active-pixel sensor (APS), a photodiode, or any other form of optical sensor. In some implementations, mobile device 108 may be configured to communicate with other electronic devices. For example, mobile device 108 may communicate wirelessly via a network with one or more other electronic devices (e.g., using a radio, cellular, satellite, or other form of transceiver). In some implementations, mobile device 108 may communicate with another electronic device via a wired connection (e.g., using an Ethernet cable, using a universal serial bus (USB) cable, or the like).

As shown, user 102 may operate mobile device 108 to capture a digital photograph of a user 104 standing in front of a physical entity 106 (e.g., the Leaning Tower of Pisa). For example, user 102 may activate the camera function of mobile device 108 by pressing a button, selecting an icon on a touch screen, or issuing a voice command. In response, mobile device 108 may convert optical signals received via one or more optical sensors into photograph data. In some implementations, the captured digital photograph may be stored within an electronic memory of mobile device 108. In further implementations, the digital photograph may be transmitted to another computing device. For example, the digital photograph may be uploaded to a website or another personal computing device over a wireless or wired network. In another example, the digital photograph may be sent to another mobile telephone via a multimedia messaging service (MMS) message.

According to various implementations, mobile device 108 may be configured to determine a geographical location of mobile device 108. For example, mobile device 108 may utilize a global positioning system (GPS), cellular triangulation, the locations of one or more mobile hotspots (e.g., Wi-Fi routers or other routers using any IEEE 802.11 communication standard), or a similar mechanism to record geographic data indicative of the location of mobile device 108. Alternatively, the user may manually set a location in a memory of the device using a display and/or keyboard of the device. In some implementations, mobile device 108 may be configured to receive a location as input from a user interface. For example, user 102 may specify the user's current location to mobile device 108, in some cases. The location may indicate that mobile device 108 is located in a particular city, within a given area of a city (e.g., within a certain radius of a point, within a certain number of city blocks, etc.), at a street address, or at a named establishment, according to various examples.

Mobile device 108 may associate location data with a captured digital photograph. For example, mobile device 108 may associate the digital photograph with location data indicative of where the digital photograph was captured. In some implementations, the location data may be stored as metadata within the same data file as the digital photograph. For example, the digital photograph may conform to the exchangeable image file (Exif) format, which specifies a number of metadata tags that may be defined for an image (e.g., location data, date and time data, camera settings, etc.). In other implementations, the location data may be stored in a separate file, database, or other storage mechanism. For example, a digital photograph of user 104 and physical entity 106 may be associated with location data that indicates that the photograph was taken in Pisa, Italy.

In some implementations, mobile device 108 may be configured to generate timestamp data associated with a digital photograph. The timestamp data may indicate the time and/or date at which the digital photograph was captured. For example, a digital photograph of user 104 and physical entity 106 may be associated with a timestamp indicative of the photograph being taken on Aug. 11, 2013 at 11:30 AM, GMT. The current date and/or time may be determined by mobile device 108 (e.g., based on an internal clock) or may be received by mobile device 108 (e.g., from a mobile base station, via input from user 102, etc.). In other implementations, the timestamp data may be associated with the digital photograph by another computing device. For example, mobile device 108 may be configured to automatically (e.g., without further instructions from user 102) upload a captured photograph to a remote server. In such a case, the remote server may associate a timestamp with the digital photograph indicative of when the photograph was received by the server (e.g., to approximate when the photograph was captured). The device 108 may be configured to allow a user to toggle on and off the location and time determination features of the device and/or images captured.

While the media content captured by mobile device 108 is described primarily with regard to a digital photograph, the media content may be any form of media content in other implementations. For example, captured media content may be a video, a light-field image, an animated image (e.g., an animated GIF, etc.). In further implementations, mobile device 108 may include a microphone or similar electronic device configured to capture audio signals. In such cases, the captured media content may be, or may include, audio data. For example, the media content captured by mobile device 108 may be an audio file or a video file that includes audio.

Figure 2:
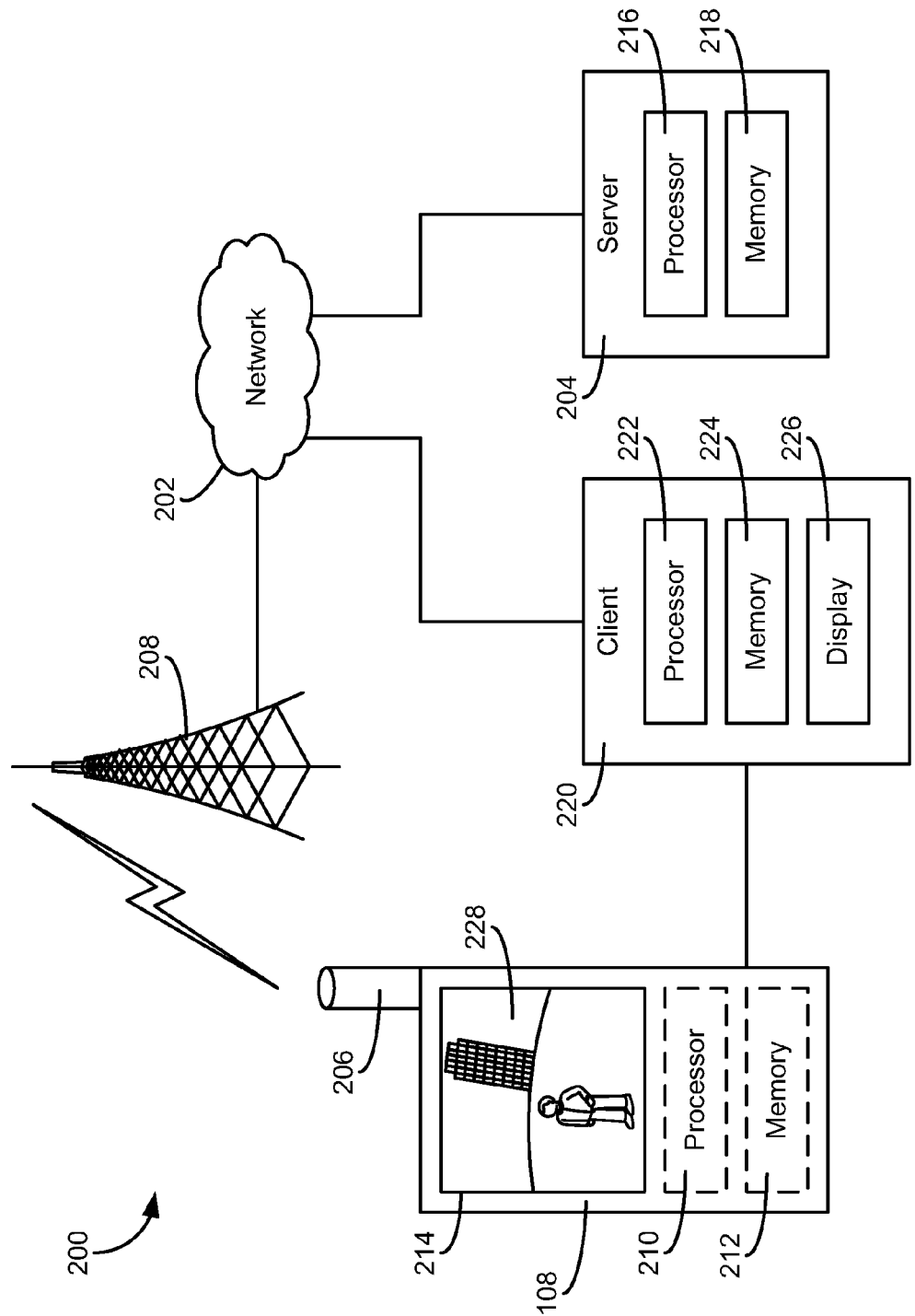
FIG. 2 is an illustration of a computer system in accordance with a described implementation.

Referring to FIG. 2, an illustration of a computer system 200 is shown. System 200 may include a server 204 in communication with other electronic devices via a network 202. In some implementations, mobile device 108 may communicate with server 204 via network 202. According to various implementations, server 204 may be configured to allow numerous users to access uploaded digital photographs and/or other forms of captured media content. For example, server 204 may be a server of a website or similar online service for sharing photographs (e.g., a social networking service, a photography website, etc.). In further implementations, a client 220 may be in communication with server 204 via network 202 and utilized by a user to access the functions of server 204.

Network 202 may be any form of computer network that relays information between server 204, client 220, and/or mobile device 108. For example, network 202 may include the Internet and/or other types of data networks, such as a local area network (LAN), a wide area network (WAN), a cellular network, satellite network, or other types of data networks. Network 202 may also include any number of computing devices (e.g., computer, servers, routers, network switches, etc.) that are configured to receive and/or transmit data within network 202. Network 202 may further include any number of wired and/or wireless connections. For example, mobile device 108 may communicate wirelessly (e.g., via WiFi, cellular, radio, etc.) with a transceiver station 208 that is wired to other computing devices in network 202 (e.g., via a fiber optic cable, a CAT5 cable, etc.).

Mobile device 108 may be any form of portable electronic device that includes a processor 210 and a memory 212, i.e., a processing circuit. Mobile device 108 may also include one or more optical sensors in communication with processor 210. Memory 212 may store machine instructions that, when executed by processor 210, cause processor 210 to perform one or more of the operations described herein. For example, the instructions stored in memory 212 may cause processor 210 to activate the optical sensors and use the received optical data to generate a digital photograph. Memory 212 may be further configured to store one or more digital photographs. Processor 210 may include a microprocessor, ASIC, FPGA, etc., or combinations thereof. Memory 212 may include, but is not limited to, electronic, optical, magnetic, or any other storage or transmission device capable of providing processor 210 with program instructions and/or storing a digital photograph. Memory 212 may include a floppy disk, CD-ROM, DVD, magnetic disk, memory chip, ROM, RAM, EEPROM, EPROM, flash memory, optical media, or any other suitable memory from which processor 210 can read instructions. The instructions may include code from any suitable computer programming language such as, but not limited to, C, C++, C#, Java, JavaScript, Perl, HTML, XML, Python and Visual Basic. In some implementations, memory 212 may be, or may include, a removable memory device (e.g., a flash drive, a memory stick, a secure digital (SD) card, etc.).

According to various implementations, mobile device 108 may include a transceiver 206 configured to communicate wirelessly with network 202 via transceiver station 208. For example, transceiver station 208 may be a cellular tower, a mobile hotspot (e.g., a Wi-Fi access point), a satellite transceiver, or similar mechanism that provides wireless access to network 202. According to various implementations, mobile device 108 may be configured to communicate directly with client 220, in addition to, or in lieu of communicating with transceiver station 208. For example, mobile device 108 may be wired to client 220 via a cable (e.g., a USB cable, a parallel port cable, etc.). In another example, mobile device 108 may communicate wirelessly with client 220 via transceiver 206 using a short-range wireless protocol (e.g., ad-hoc Wi-Fi, Bluetooth, etc.). In further implementations, a removable memory device may be shared between mobile device 108 and client 220 to transfer data between the devices.

In various implementations, transceiver 206 may receive data used to determine the location of mobile device 108. For example, transceiver 206 may receive data from a wireless base station, a GPS satellite, or similar device. Processor 210 may utilize the data received via transceiver 206 to generate location data for mobile device 108. For example, transceiver 206 may receive data from a number of mobile base stations and processor 210 may utilize triangulation to generate location data indicative of the current geographic location of mobile device 108. In further implementations, transceiver 206 may receive data indicative of the current time and/or date from transceiver station 208.

Mobile device 108 may include one or more user interface devices, according to various implementations. A user interface device may be any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to the housing of mobile device 108 (e.g., a built-in display, microphone, etc.) or external to the housing of mobile device 108 (e.g., a monitor connected to mobile device 108, a speaker connected to mobile device 108, etc.), according to various implementations. For example, mobile device 108 may include an electronic display 214, which may display a digital photograph 228 captured by mobile device 108 and/or a GUI for a media content sharing service of server 204.

Client 220 may include any number of different types of user electronic devices configured to communicate via network 202 (e.g., a laptop computer, a desktop computer, a tablet computer, a smartphone, a digital video recorder, a set-top box for a television, a video game console, combinations thereof, etc.). Similar to mobile device 108, client 220 may have a processing circuit that includes a processor 222 and a memory 224 that stores program instructions executable by processor 222. In some implementations, client 220 may include an electronic display 226, internally or externally, to provide a user with a user interface for the media content sharing service of server 204 (e.g., an application stored in memory 224, a website provided by server 204, etc.)

Server 204 may include one or more electronic devices configured to communicate with other electronic devices via network 202 and to provide the electronic devices with access to a service for sharing digital photographs and/or other forms of captured media content among users. In some implementations, users of the media content sharing service of server 204 may create user profiles to access the service. Server 204 may provide a user interface for the media content sharing service to other electronic devices via network 202. For example, server 204 may provide a website to client 220 and/or to mobile device 108. In another example, client 220 and/or mobile device 108 may run a stand-alone application dedicated to accessing the media content sharing service of server 204.

Similar to mobile device 108, server 204 may have a processing circuit that includes a processor 216 and a memory 218. Memory 218 may store instructions for execution by processor 216 to perform the functions associated with a social networking system. According to various implementations, server 204 may be a set of networked devices (e.g., a data center, a plurality of data centers, a cloud computing environment, etc.) that operate in conjunction to perform the functions described herein. In such a case, the processing circuit of server 204 may include the combined set of processors and memories of the different devices. For example, server 204 may include a web server that provides webpages to client 220 and/or to mobile device 108 and a back-end database that stored user profiles and other data associated with the social networking system.

According to various implementations, mobile device 108 and/or client 220 may provide a digital photograph or other form of media content captured by mobile device 108 to server 204 via network 202, to share the content with one or more other user profiles of the media content sharing service, either individually or as part of a collection or sequence of content. The captured media content may have associated location data and/or timestamp data indicative of where and when the content was captured, which may also be transferred to server 204. In some implementations, mobile device 108 may upload the content and/or the metadata for the content directly to server 204 via network 202. For example, mobile device 108 may transfer the content to server 204 via transceiver station 208. In other implementations, mobile device 108 may transfer the content and/or metadata for the content to client 220, which transfers the captured media content to server 204 via network 202. For example, the content may be transferred from mobile device 108 to client 220 wirelessly via a local area network, via a wired connection (e.g., a USB cable, a serial cable, etc.), or via a removable memory device.

Captured media content transferred to server 204 may be associated with a first user profile, according to various implementations. In some implementations, the user that captured the content and/or uploaded the content to server 204 may have a user profile for the media content sharing service. In such a case, the content may be shared with one or more other user profiles of the media content sharing service of server 204. For example, a second user may log into a second user profile of the service to view an uploaded photograph.

In some implementations, the media content sharing service of server 204 may be a social networking service. In general, a social networking service allows a user to create a profile and associate the profile with those of other users. A "social connection" may refer to a user profile in a social networking service that is associated with a profile of another user. The association between the two user profiles may reflect a real-world social relationship between the two users. For example, a user may designate a friend's profile as being a social connection. In some implementations, different types of associations may be used within a social networking service. Similar to real-life social relationships, a user of a social networking service may classify the types of associations between the user's profile and those of other users. As used herein, the term "social networking group" refers to a group of social connections having one or more common characteristics. For example, a user may designate a first group of one or more other user profiles as belonging to family members and a second group of one or more other user profiles as belonging to classmates. In some implementations, a social networking group may be a group devoted to a certain topic. For example, a social networking group may be philatelists, fans of a particular sports team, or members of a charitable organization.

According to various implementations, location and/or timestamp data associated with uploaded media content may be used by server 204 to control access to the content within the media content sharing service. In various implementations, server 204 may compare the location and/or timestamp data associated with the content with location and/or timestamp data associated with a user profile attempting to perform an action regarding the content (e.g., viewing the content, listening to the content, downloading the content, recommending the content, rating the content, commenting on the content, tagging a person or entity in the content, etc.). The location data for the user profile compared with that of the content may coincide temporally, in some implementations. For example, an action regarding the content may be restricted to users that were present when the media content was captured. In other implementations, the location data for the user profile compared with that of the media content may be the most current location data associated with the profile. For example, a user may only have access to view a photograph when attempting to access the photograph from the same location in which the photograph was taken (e.g., a user may only be able to view a photograph taken in Chicago if the user is currently located in Chicago).

Server 204 may associate location and/or timestamp data with a user profile in any number of ways, if the owner of the profile has opted in to allowing server 204 to store location data. In some implementations, location and/or timestamp data may be provided to server 204 periodically or whenever an electronic device accesses server 204. For example, a mobile device (e.g., mobile device 108 or another mobile device) may send location and/or timestamp data to server 204 periodically, if the user of the device is logged into his or her user profile. In some implementations, image recognition may be used by a device in system 200 to determine whether a user was present when a digital photograph or similar visual media file was captured. For example, server 204 may use facial recognition on an uploaded photograph to identify other users of the service in the photograph. In such a case, the location data associated with the photograph itself may also be associated with the profiles for the identified users. In further implementations, the location data for the media content may be determined using image recognition. For example, server 204 may recognize the Leaning Tower of Pisa in a digital photograph and associate the photograph with the location of Pisa, Italy. In some implementations, mobile device 108 may attempt to identify other mobile devices that are in close proximity when the media content is captured. For example, mobile device 108 may transmit an identification request to other mobile devices near mobile device 108 when a photograph is taken. In response, a neighboring mobile device may reply with data indicative of that user's profile. For example, user A may operate mobile device 108 to take a photograph. Mobile device 108 may then transmit a local request to another mobile device operated by user B. In response to the request, the other mobile device may respond with data indicative of the profile for user B. Mobile device 108 may then transmit such information to server 204 when the photograph is uploaded.

Figure 3:
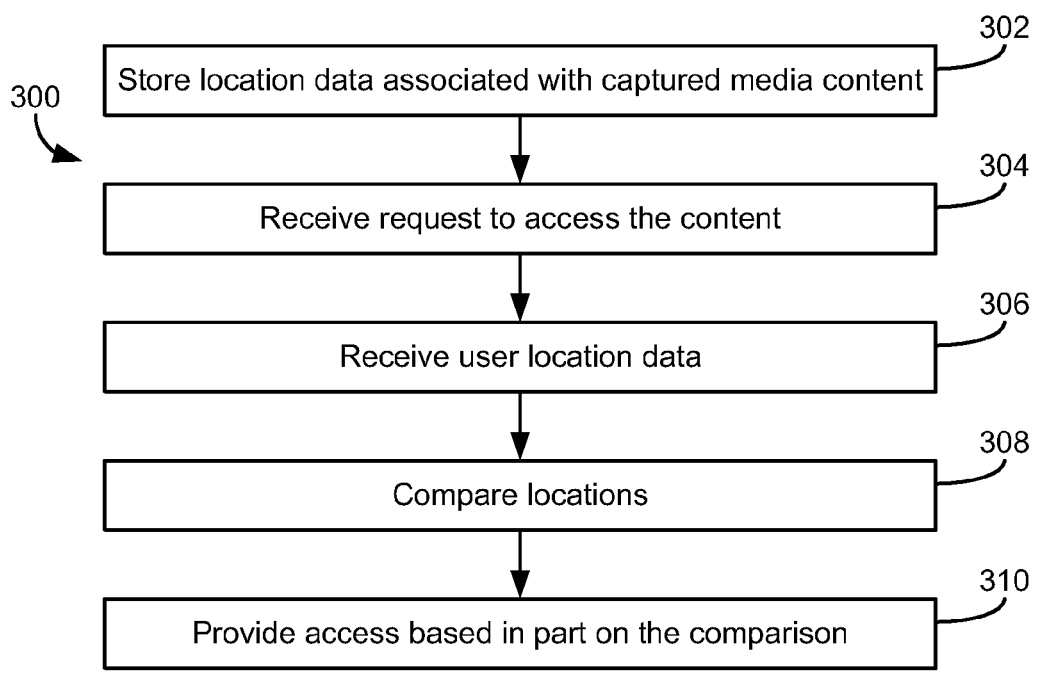
FIG. 3 is a process for providing access to captured media content.

Referring to FIG. 3, an example process 300 for providing access to captured media content is shown. Process 300 includes storing location data associated with captured media content in an electronic storage device (block 302). According to various implementations, the location data associated with the media content may indicate the location at which the content was captured. The location data may be metadata stored as part of the media content. For example, a digital photograph may be in Exif or a similar format that allows storage of location data as a metadata tag within the image file. In other implementations, the location data may be stored separately from the content. For example, the location data may be stored in a separate file or database. In some cases, the location data may even be stored in a separate electronic storage device as that of the captured media content. In further implementations, the location data associated with the media content may include a timestamp indicative of the time and/or data when the content was captured.

Process 300 includes receiving a request to access the media content (block 304). According to various implementations, the request may be a request to perform any action with regard to the content. For example, the request may correspond to a request to view and/or listen to the content, share the content with a social connection, rate the content positively or negatively, comment on the content, tag an entity in the content (e.g., a user may identify another user in a photograph), associate the content with a social networking group, associate the content with a social event, or associate the content with another user profile. Similarly, the request may correspond to an action performed by a server of the media content sharing service (e.g., providing the content to be viewed, associating a rating with the content, associating a comment with the content, etc.).

In various implementations, the request to access the media content may be associated with a user identifier for the user seeking access to the content. In general, a user identifier may be any form of data used to uniquely represent a particular user. In some implementations, a user identifier may be a device identifier (e.g., a serial number, a telephone number, a cookie set on a device, etc.) or may be associated with a device identifier. In further implementations, a user identifier may be a user profile or data associated with a user profile of the media content sharing service.

In some implementations, the received request may include user location data with the request. In general, user location data refers to any data indicative of a previous, current, or future location of a user requesting access to the content. For example, a user of a social networking service may use a mobile device to request access to a photo album of a social connection. In such a case, the user's mobile device may include location and/or timestamp data regarding the current location of the mobile device with the request. In other implementations, an origination location for a request may be determined based on a network address for the requesting device. For example, the IP address of a requesting device may be used to estimate a location of the requesting device. Such a location may then be associated with the user identifier used to request access to the content. In some implementations, location data sent from a requesting device may include a timestamp. In other implementations, the device receiving the request may generate a timestamp for a location based on the time and/or date the request was received.

Process 300 includes receiving user location data (block 306). In some implementations, the location may be the current location of the device requesting access to the captured media content (i.e., the location from which the request originated). For example, a user may operate a mobile device while in Boise, Id., to request access to a particular photo album. In such a case, user location data indicative of the user's current location in Boise, Id., may be sent in conjunction with the request. The user location data may then be used to determine one or more permissions for the user regarding a photograph in the album.

In various implementations, the user location data may be associated with a user identifier and received from a memory that stores data associated with the user identifier. For example, a request to access a photograph may be associated with a user identifier (e.g., a user of a social networking system logs into his or her profile and requests access to a social connection's photographs, etc.). In such a case, the media content sharing service may retrieve and receive user location data associated with the user identifier. In some implementations, a user's previous or current location may be associated with an identifier for the user by receiving location from an electronic device associated with the user identifier. For example, a history of user locations may be stored by a social networking service based on location data received periodically from a user's mobile phone. In some implementations, the user location data may also include data indicative of a future location of the user. For example, a user may specify that they will be attending a particular event in the future via a calendar function. In such a case, the location of the event may also be stored as user location data associated with the identifier for the user.

In some implementations, user location data may be retrieved based on a timestamp associated with the captured media content. For example, a location associated with a photograph may also have a timestamp indicative of when the photograph was taken. Similarly, user location data may also have timestamp data indicative of when the associated user was in a particular location, when the associated user will be in a particular location, and/or when a device operated by the user was in a particular location. In some cases, a user location data may be retrieved based on the timestamp for the content. For example, assume that a photograph was taken on May 29, 2014 at 10:00 AM, GMT and has a corresponding timestamp. The content sharing system may use this date and time to determine a user location from the user location data for the requestor for the corresponding time (e.g., determining where the requesting user was on May 29, 2014 at 10:00 AM, GMT).

In further implementations, all locations indicated by the user location data may be retrieved or retrieved for a particular time period. In various implementations, user locations may be determined within the previous day, week, month, or year. For example, user location data may be analyzed to determine locations for the requesting user within the past month.

Process 300 includes comparing a location associated with the media content to a location indicated by the user location data (block 308). In some implementations, the current or most recent location indicated by the user location data may be compared to the location at which the content was captured. In further implementations, the location at which the content was captured may be compared to a user's location at or around the same time the media content was captured (e.g., within one minute, ten minutes, one hour, or one day of the photograph being taken). For example, a digital photograph may be captured in Pisa, Italy on Aug. 11, 2013 at 11:30 AM, GMT. In such a case, a location associated with the requesting user may be retrieved for Aug. 11, 2013 between a time of 11:20 AM, GMT, and 11:40 AM, GMT. In further implementations, the location at which the media content was captured may be compared to all locations indicated by the user location data (e.g., answering the question of whether the requesting user was ever at the same location as where a photograph was taken). In yet further implementations, locations indicated by the user location data within a certain time period may be compared with the location where the content was captured (e.g., answering the question of whether the requesting user was at the same location with a given day, week month, or similar range).

Process 300 further includes providing the requested access to the media content based in part on the comparison of locations (block 310). In some implementations, the requested access may be granted if a current location of a requesting user corresponds to the location at which the media content was captured. For example, assume that a digital photograph was taken at the Tangiers Casino in Las Vegas, Nev. at 3:21 AM, PDT on Aug. 14, 2014. In such a case, a user identifier associated with a request to view the photograph may only be granted access if the user identifier is associated with a current location of Las Vegas, Nev. and/or the Tangiers Casino. In further implementations, access to media content may be provided if the requesting user is associated with a time and location that corresponds to the place and time the content was captured. For example, access to the photograph may be provided if the user is associated with the Tangiers Casino in Las Vegas, Nev. at 3:21 AM, PDT on Aug. 14, 2014. In yet further implementations, access to media content may be provided if the requesting user is associated with the location at which the content was captured at any time or within a particular range of time. For example, access to the photograph may be provided if the user is associated with a location that corresponds to the Tangiers Casino at any time within the previous year or is scheduled to visit the Tangiers Casino sometime in the future.

In various implementations, additional criteria may also be used to determine whether access to the media content is provided. Exemplary additional criteria include user identifier associated with the request being a social connection of the owner of the content, a requesting user identifier belonging to a particular social networking group, and a requesting user identifier being individually granted certain permissions by the owner of the media content. For example, the owner of the content may designate that only social connections within a social networking group of "friends" are even eligible to view the content. Moreover, only the user's friends that were present when the content was captured may access the content via the social networking service.

Figure 4:
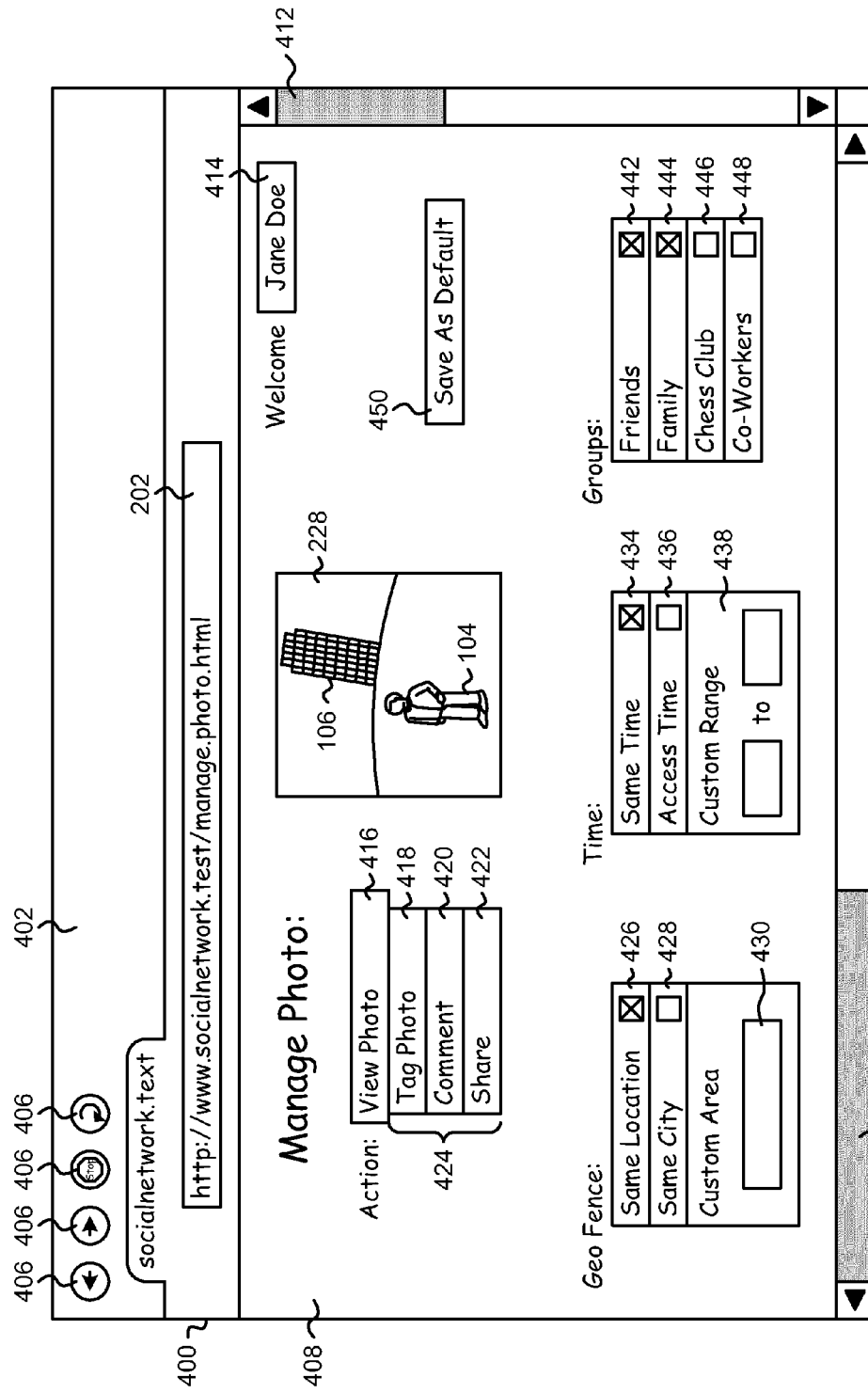
FIG. 4 is an illustration of an electronic display showing a configuration webpage of a media content sharing service.

Referring now to FIG. 4, an illustration is shown of an electronic display 400 displaying a configuration webpage 408 of a media content sharing service. As shown, display 400 may be in communication with a processing circuit that executes machine instructions and provides display data to display 400. For example, the processing circuit may execute a web browser 402 which is configured to cause the processing circuit to retrieve webpage data from a local or networked location. In other implementations, the processing circuit may execute a stand-alone application devoted to the media content sharing service. In such cases, the functions described herein with respect to webpage 408 may be integrated instead into the stand-alone application. In various implementations, a user interface device may be used to interact with webpage 408 (e.g., via a pointing device, a keypad, a microphone, etc.). In some implementations, display 400 may be a touch screen display configured to detect contact with the screen and interpret such contact as a selection of indicia on display 400.

Web browser 402 may include an input field 404 configured to receive a selection of an address at which webpage data is located. Web browser 402 may use the inputted location then to retrieve the webpage data. For example, input field 404 may receive a selection of a uniform resource locator (URL), such as http://www.socialnetwork.test/manage_photo.html. Web browser 402 may request webpage date from the address entered via input field 404. In general, webpage data may include text, hyperlinks, layout information, and other data that may be used to provide the framework for the visual layout of displayed webpage 408. In some implementations, webpage data may be one or more files of webpage code written in a markup language, such as the hypertext markup language (HTML), extensible HTML (XHTML), extensible markup language (XML), or any other markup language. For example, the webpage data in FIG. 5 may include a file, "manage_photo.html" provided by the website, "www.socialnetwork.test." The webpage data may include data that specifies where indicia, such as text, appears on webpage 408. In some implementations, the webpage data may also include additional URL information used by the client device to retrieve additional webpage data (e.g., text, images, scripts, etc.). For example, the file, "manage_photo.html," may also include one or more scripts used by web browser 402 to transmit data to the social networking service.

Web browser 402 may include any number of navigational controls 406 configured to perform navigational functions when selected via a user interface device. In some implementations, navigational controls 406 may include one or more inputs configured to cause web browser 402 to navigate forward or backwards between previously visited webpages (e.g., a forward button, a back button, etc.). Navigational controls 406 may also include any number of inputs configured to control the loading of the current webpage. For example, navigational controls 406 may include an input configured to cause the current webpage to stop loading (e.g., a stop button) and an input configured to cause the current webpage to be reloaded (e.g., a refresh button). Web browser 402 may further include one or more scroll bars 410, 412, configured to cause the horizontal and/or vertical position of webpage 408 to be adjusted, if webpage 408 is larger than the displayed area of web browser 402.

According to various implementations, webpage 408 may be configured to allow a user of the media content sharing service to control access to uploaded media content. As shown, a user may log into their user profile of the service and specify security settings regarding an uploaded photograph 228. For example, the user, Jane Doe, may log into her user profile to control access to digital photograph 228. In other implementations, webpage 408 may be configured to control access to any form of captured media content (e.g., a movie, sound file, photograph, etc.). In some implementations, webpage 408 may include indicia 414 of the user being logged into her profile. While webpage 408 is shown with regard to a single photograph, webpage 408 may be configured to allow a user to control access to any number of photograph, according to various implementations. For example, webpage 408 may be configured to allow control to a photo album or other collective set of photograph or images.

Webpage 408 may include an input field 416 configured to receive a selection of an action regarding photograph 228. For example, input field 416 may receive a selected action that corresponds to viewing photograph 228. In various implementations, actions that may be controlled regarding photograph 228 include viewing photograph 228, commenting on photograph 228, sharing photograph 228 with a social connection, rating photograph 228, downloading photograph 228, tagging a person or object in photograph 228 (e.g., specifying the identity of user 104 in photograph 228, specifying that physical entity 106 in photograph 228 is the Leaning Tower of Pisa, etc.), associating photograph 228 with a social event (e.g., "2009 Class Trip to Italy"), deleting photograph 228, editing photograph 228, or any other action associated with interacting with a digital photograph. As shown, input field 416 may include a dropdown box 424 that presents a number of actions 418-420 for selection (e.g., tagging photograph 228, commenting on photograph 228, sharing photograph 228 with a social connection, etc.). In other implementations, input field 416 may utilize any number of different types of graphical user functions (e.g., a simple text box, a list of actions, radial buttons, checkboxes, or the like).

In the example shown, Jane Doe has selected "View Photo" via input field 416 as the action to control regarding photograph 228. Security settings entered via webpage 408 may then be used by the media content sharing service to control which user profiles of the service are able to view photograph 228. In other words, the user that uploaded photograph 228, i.e., Jane Doe, may have control over which users are able to interact with photograph 228 and which actions the users are able to perform regarding photograph 228.

In various implementations, webpage 408 may allow creation of a geo fence, i.e., access permissions for photograph 228 that are based on user location data for the user requesting access. For example, webpage 408 may include various configuration inputs 426-430 to allow the user of webpage 408 to control access to photograph 228 based on any number of geographical-based permissions. In some implementations, input 426 may be configured to receive a selection that only user profiles associated with the same location as where photograph 228 was taken may perform the action selected via input field 416 (e.g., only user profiles also associated with the location of the Leaning Tower of Pisa may view photograph 228). In various implementations, the same location may refer to the exact location where photograph 228 was taken or may refer to an area surrounding where photograph 228 was captured. For example, the degree of precision when determining the location of the device that took photograph 228 may vary based on the technology used (e.g., GPS, cellular triangulation, IP address lookup, etc.). In such cases, selection of input 426 may include a predefined range around the location at which photograph 228 was captured (e.g., within 50 meters of the location, within 100 meters of the location, etc.).

In some implementations, webpage 408 may include input 428 configured to restrict access to photograph 228 to those users and/or user profiles associated with the same city where photograph 228 was taken. For example, a user profile that is associated with the location of Pisa, Italy may have access to photograph 228, even if the user never actually visited the Leaning Tower of Pisa. In other implementations, input 428 may allow selection of any other predefined form of geographical area (e.g., the same city block, the same state, the same country, etc.).

In further implementations, webpage 408 may include input 430 configured to allow a custom area to be defined by the user of webpage 408. In some cases, input 430 may be configured to allow selection of a radius or other measurement that defines an area relative to the location where photograph 228 was captured. For example, the user of webpage 408 may utilize input 430 to specify that users and/or user profiles associated with locations within one kilometer of the Leaning Tower of Pisa have access to photograph 228. In some implementations, input 430 may be configured to allow the user to specify a custom area on a map. For example, input 430 may display a map of Pisa, Italy and receive a custom selection of a portion of Pisa. In one implementation, the custom area received via input 430 may be unrelated to the location where photograph 228 was captured. For example, Jane Doe may only allow user profiles associated with the location of her school to access photograph 228.

Webpage 408 may be configured to receive a selection of a temporal component to a created geo fence. In various implementations, webpage 408 may include configuration inputs 434-438 used to restrict the temporal range for locations associated with a user and/or user profile attempting access to photograph 228. In other words, inputs 426-430 may be used to restrict access to photograph 228 based on where a particular user is, was, or will be located. Similarly, inputs 434-438 may be used to restrict access to photograph 228 based on when the particular user is, was, or will be in that location.

In some implementations, webpage 408 may include input 434 configured to restrict the temporal range to the same time or time frame when photograph 228 was captured. For example, selection of input 426 and input 434 may restrict access to photograph 228 to those user profiles associated with data indicative of those users being present when photograph 228 was captured. In other words, access to photograph 228 may be restricted to those users that were also present near the Leaning Tower of Pisa when photograph 228 was taken. In various implementations, a user being present when photograph 228 was taken may be determined via image recognition of photograph 228 (e.g., facial recognition may be used to identify user 104), via a user being tagged in photograph 228 by another user (e.g., a social connection may identify user 104), via location data received from a mobile device of the user (e.g., using location data from a mobile phone of user 104), or via a local ping sent from the device that captured photograph 228 to nearby devices.

Webpage 408 may include input 436 configured to restrict the analyzed temporal range to the same time or time frame as an access request (e.g., when the request is generated, when the request is received, etc.). For example, selection of input 428 and input 436 may restrict access to photograph 228 to users that are currently located in the same city where photograph 228 was taken (e.g., Pisa, Italy). In other words, a user may be able to view photograph 228 via the media content sharing service when the user is in Pisa, Italy, but not able to view photograph 228 when located in Boise, Id.

Webpage 408 may include input 438 configured to restrict the analyzed temporal range to a custom range specified via input 438. Thus, Jane Doe may restrict a geo fence regarding photograph 228 to a specified date and/or time range via webpage 408. For example, Jane Doe may use input 430 to specify a radius of 500 meters surrounding the Leaning Tower of Pisa and input 438 to specify a range of Aug. 11, 2014 at 11:00 AM, GMT to Aug. 11, 2014 at 12:00 PM, GMT. Thus, a user profile that was associated with a location within 500 meters of the Leaning Tower of Pisa during the specified temporal range may have access to photograph 228.

According to various implementations, webpage 408 may include one or more inputs 442-448 configured to restrict access to photograph 228 based on a user profile's membership in a social networking group, if the media content sharing service is also a social networking service. In some implementations, a social networking group may be public (e.g., users having profiles in the group may request to join the group). For example, a social networking group may be devoted to a chess club. Users having profiles in the social networking service may request to join the chess club social networking group. In some implementations, a social networking group may be private (e.g., a particular user may add or remove social connections from the group). For example, Jane Doe may create social networking groups for her friends, family, and co-workers (e.g., to organize her social connections). Users having profiles in such groups may or may not have knowledge of their membership in the group.

As shown, inputs 442-448 may be used to restrict access to user profiles in the friends, family, chess club, or co-workers social networking groups, respectively. For example, Jane Doe may specify a commenting action via input field 416 and select inputs 426, 434, and 444. In such a case, the ability to comment on photograph 228 in the system may be restricted to those user profiles in the social networking group for family of Jane Doe that were present when photograph 228 was captured.

In some implementations, webpage 408 may include an input 450 configured to save permission settings entered via webpage 408 as default settings. Such default settings may apply, for example, automatically to any uploaded photograph or set of photographs (e.g., photographs uploaded to a particular album, etc.). In other words, the default settings may be applied without further input from the user uploading the photograph. Default settings may be stored on the local device (i.e., the device having display 400) or may be stored by a server of the media content sharing service, according to various implementations. In some implementations, default settings may not apply automatically to newly uploaded photographs, but may instead pre-populate inputs of webpage 408 when webpage 408 is revisited.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an opesocial networking system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a USB flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending websites to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a GUI or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A computerized method comprising:
receiving first location data indicative of a first geographic location at which media content was captured, wherein the first geographic location at which the media content was captured is associated with a first region;
receiving first timestamp data indicative of a first time at which the media content was captured;
associating the first location data and the first timestamp data with the media content;
receiving, at a processing circuit, second location data and second timestamp data from an electronic device, the electronic device being associated with a user identifier, the second location data indicative of a second geographic location, and the second timestamp data indicative of a second time at which the electronic device was located at the second geographic location, wherein the second geographic location at which the electronic device was located is associated with a second region, and wherein the first region is different from the second region;
receiving, by a processing circuit, a request to view the media content, the request being associated with the user identifier and received from the electronic device;
comparing, by the processing circuit, the first location data and the first timestamp data associated with the media content with the second location data and the second timestamp data associated with the electronic device;
determining, based on the comparison, whether the second time is within a time frame that is based on the first time, wherein the time frame is indicative of the electronic device being present at or around the first geographic location at the first time at which the media content was captured; and
providing, via a network interface, the media content to the electronic device based in part on the second time being determined to be within the time frame and whether the user identifier associated with the request is a member of a user defined or generated social networking group.

2. A computerized method comprising:
storing media content in a memory, the media content having associated data indicative of a first geographic location at which the media content was captured by a first electronic device and first timestamp data indicative of a first time at which the media content was captured, wherein the first geographic location at which the media content was captured is associated with a first region;
receiving, by a processing circuit, a request to perform an action regarding the media content, the request being associated with user location data indicative of a second geographic location of a second electronic device associated with a requesting user and second timestamp data indicative of a second time at which the requesting user was located at the second geographic location, wherein the second geographic location at which the second electronic device was located is associated with a second region, and wherein the first region is different from the second region;
comparing, by the processing circuit, the first geographic location and the first timestamp data with the second geographic location and the second timestamp data;
determining, based on the comparison, whether the second time is within a time frame that is based on the first time, wherein the time frame is indicative of the first electronic device being present at or around the first geographic location at the first time at which the media content was captured; and
performing the action regarding the media content based in part on the second time being within the time frame and whether a user identifier associated with the requesting user is a member of a user defined or generated social networking group.

3. The method of claim 2, wherein the first region is a subset of the second region.

4. The method of claim 2, wherein the second region is unrelated to the first geographic location where the media content was captured.

5. The method of claim 2, further comprising determining the first geographic location by identifying a landmark in the media content and determining a location of the landmark.

6. The method of claim 2, wherein the second geographic location and the second timestamp data are determined by the first electronic device by identifying the second electronic device as being near the first electronic device based on the second electronic device receiving a local ping from the first electronic device.

7. The method of claim 2, further comprising
associating the requesting user, the second geographic location, and the second timestamp data with a user profile in a social network that also includes the social networking group.

8. The method of claim 2, wherein the action regarding the media content comprises associating a rating with the media content or associating a comment with the media content.

9. A computerized system comprising:
a processing circuit configured to:
store media content, the media content having associated data indicative of a first geographic location at which the media content was captured by a first electronic device and first timestamp data indicative of a first time at which the media content was captured, wherein the first geographic location at which the media content was captured is associated with a first region;
receive a request to perform an action regarding the media content, the request being associated with user location data indicative of a second geographic location of a second electronic device associated with a requesting user and second timestamp data indicative of a second time at which the requesting user was located at the second geographic location, wherein the second geographic location at which the second electronic device was located is associated with a second region, and wherein the first region is different from the second region;
compare the first geographic location and the first timestamp data with the second geographic location and the second timestamp data;
determine whether the second time is within a time frame that is based on the first time, wherein the time frame is indicative of the first electronic device being present at or around the first geographic location at the first time at which the media content was captured; and
perform the action regarding the media content based in part on the second time being within the time frame and whether a user identifier associated with the requesting user is a member of a user defined or generated social networking group.

10. The system of claim 9, wherein the action regarding the media content comprises providing the media content to the second electronic device that generated the request.

11. The system of claim 9, wherein the second region is unrelated to the first geographic location where the media content was captured.

12. The system of claim 9, wherein the processing circuit is further operative to determine the first geographic location by identifying a landmark in the media content and determining a location of the landmark.

13. The system of claim 12, wherein the action regarding the media content includes associating the first geographic location with a user profile of the requesting user in a social network that also includes the social networking group.

14. The system of claim 9, wherein the second geographic location and the second timestamp data are determined by the first electronic by identifying the second electronic device as being near the first electronic device based on the second electronic device receiving a local ping from the first electronic device.

15. The system of claim 9, wherein the processing circuit is further operative to
associate the requesting user, the second geographic location, and the second timestamp data with a user profile in a social network that also includes the social networking group.

16. The system of claim 9, wherein the action regarding the media content comprises associating a rating with the media content or associating a comment with the media content.

17. The system of claim 9, wherein the second geographic location is a future location at which the requesting user is scheduled to be located.

* * * * *